United States Patent [19]

Mahnken

[11] 4,347,995
[45] Sep. 7, 1982

[54] BI-DIRECTIONAL TAPE REEL BRAKE

[75] Inventor: Walter J. Mahnken, Littleton, Colo.

[73] Assignee: Honeywell Inc., Minneapolis, Minn.

[21] Appl. No.: 218,954

[22] Filed: Dec. 22, 1980

[51] Int. Cl.³ .................... G03B 1/04; G11B 15/32
[52] U.S. Cl. ................................ 242/204; 318/7;
360/73
[58] Field of Search ...................... 242/200–204;
360/73; 318/7

[56]  References Cited

U.S. PATENT DOCUMENTS

| | | | |
|---|---|---|---|
| 2,967,673 | 1/1961 | Fujii | 242/204 |
| 3,057,570 | 10/1962 | Smith | 242/203 |
| 3,153,515 | 10/1964 | Scully et al. | 242/204 |

Primary Examiner—Leonard D. Christian
Attorney, Agent, or Firm—Lockwood D. Burton; Mitchell J. Halista

[57] ABSTRACT

A bidirectional tape reel brake has a spring loaded movable plate coaxially encircling a motor shaft and arranged to exert a braking force on the motor shaft in proportion to the spring pressure on the brake plate. A brake pad support plate is attached to an end of the motor shaft to position brake pads on the support plate between the movable plate and a fixed brake plate. A first spring is arranged to urge the movable plate toward the brake plate to clamp the brake pads therebetween. A plurality of supplementary or second springs are arranged to exert a supplementary braking force by providing additional spring pressure to the brake plate. The supplementary springs are selectively positionable between a spring position in which the supplementary springs act against the brake plate in a first angular orientation to produce a first spring force and to a second position in which the supplementary springs act against the brake plate in a second angular orientation to produce a second spring force which is less than the first spring force.

10 Claims, 4 Drawing Figures

BI-DIRECTIONAL TAPE REEL BRAKE

BACKGROUND OF THE INVENTION

1. Field Of The Invention

The present invention relates to tape recorders. More specifically, the present invention is directed to a tape reel brake for tape recorders.

2. Description Of The Prior Art

In tape recorders using a pair of tape reels to store and to supply a recording tape therebetween, it is desirable to provide a differential braking action on the tape reels. Thus, the tape reel supplying the tape to the tape drive system should have a greater braking force applied to it than the tape reel accepting tape from the tape transport system in order to maintain tape tension and prevent loose loops of tape particularly when the tape is not being driven by a tape capstan. Since a recorder is a bi-directional device, i.e., the tape can be driven in either direction by the tape capstan, each tape reel should be capable of two levels of braking, i.e., a first level when the tape reel is supplying tape and a second braking level when the tape reel is accepting tape. It is further desirable that the braking effect and the selection of braking force levels be completely automatic in operation during a switching of the tape travel direction. The use of a simple slipping clutch to provide a braking action determined by spring pressure on the clutch is well-known in the art as shown in U.S. Pat. No. 2,643,531. On the other hand, there have been prior art attempts to provide changes in the braking force on tape reels dependent on the direction of travel of the recording tape as shown in U.S. Pat. Nos. 3,452,840; 3,670,992; 3,690,588 and 3,869,100. All of these prior art devices use complicated mechanical structures for achieving such a bi-directional reel braking effect and, consequently, are unable to provide a cost-effective structure on a tape recorder.

SUMMARY OF THE INVENTION

An object of the present invention is to provide an improved tape reel brake for a tape recorder.

In accomplishing this and other objects, there has been provided, in accordance with the present invention a tape reel brake having a first spring means arranged to urge brake pads connected to a tape reel motor shaft against a braking surface and a second spring means selectively positionable between a first position to add a first braking effect by the brake pads supplementary to that produced by the first spring means and a second position to add a second braking effect supplementary to that produced by the first spring means with the first braking effect being greater than the second braking effect.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Figure 1:
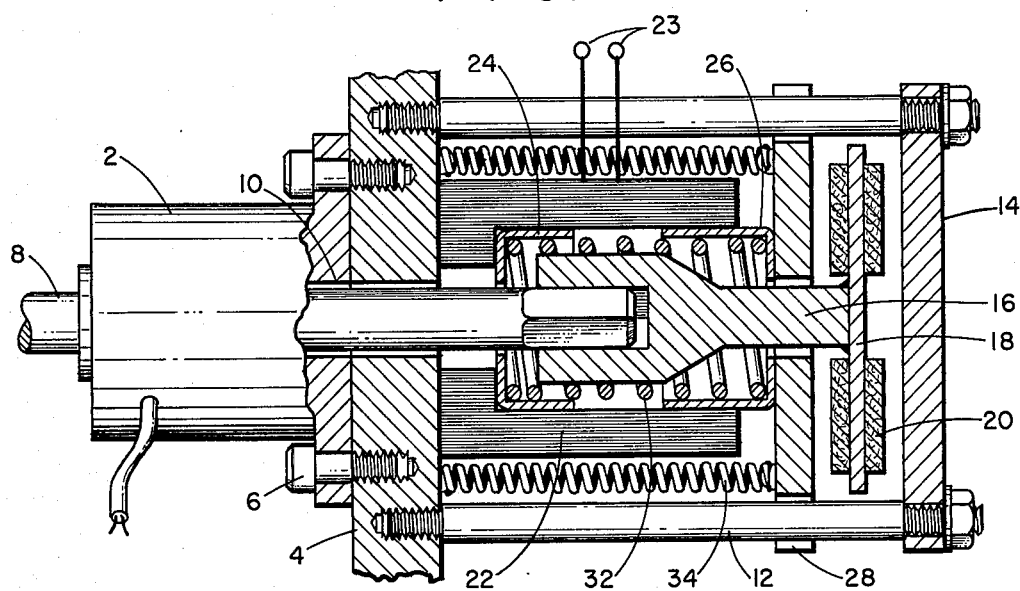
FIG. 1 is a cross-sectional illustration of an example of an embodiment of the present invention.

Referring to FIG. 1 in more detail, there is shown a tape reel brake for a tape reel motor 2. The tape reel motor 2 is attached to a tape transport housing 4 by any suitable means such as machine screws 6. A motor shaft 8 has one end extending from one end of the motor 2 to drive a tape reel (not shown). The other end 9 of the motor shaft 8 is also extended from the other end of the motor 2 through an opening 10 in the tape transport structure 4 to a tape reel brake mechanism also attached to the tape transport structure 4. The tape reel brake includes a plurality of spacer rods 12 attached at one end to the tape transport structure 4 and at the other end to a brake plate 14. The spacer rods 12 are evenly spaced and are arranged coaxially with the end of the motor shaft 8 extending through the opening 10 in the tape transport wall 4. A coaxial shaft extension 16 is slidably coupled to the end 9 of the motor shaft 8 by a yoke 17 and is arranged to coaxially support at its outer end a brake support plate 18. The brake support plate 18 has a plurality of brake pads 20 attached to both sides of its outside surface near its periphery and arranged parallel to the brake plate 14.

An electromagnetic coil 22 having power input terminals 23 is coaxially arranged around the end 9 of the motor shaft 8, the yoke 17 and the shaft extension 16 within the area encompassed by the spacer rods 12. The electromagnet coil 22 is attached to the transport wall 4 by any suitable means (not shown) and is spaced from the motor shaft end 9, the yoke 17, the extension 16 and the spacer rods 12. An inner cup washer 24 is coaxially arranged with respect to the motor shaft 8 while being spaced therefrom and is mounted abutting the inner end of the electromagnet 22. An outer cup washer 26 is also coaxially arranged with respect to the motor shaft extension 16 while being spaced therefrom and is mounted on a magnetic plate 28 located between the outer end of the coil 22 and the disc brake pads 20 on the inner surface 29 of the brake disc 28. The magnetic plate 28 extends past the rods 12 and is provided with cutouts 30 for accommodating the spacer rods 12. A first expansion spring 32 is located between the first cup washer 24 and the second cup washer 26 and coaxial with the extension 16 and the yoke 17. A plurality of supplementary expansion springs 34 are located between the wall 4 of the tape transport and the magnetic plate 28 in the space between the coil 22 and the rods 12.

Figure 2:
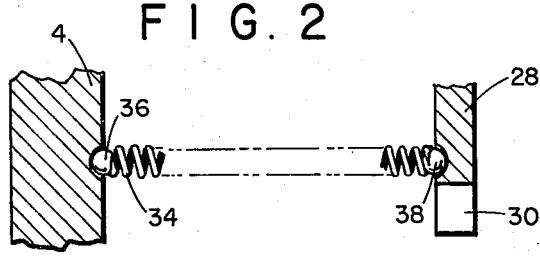
FIG. 2 is an illustration of a first operation of a portion of the example of the present invention shown in FIG. 1.

As is shown in FIG. 2, an example of one of the supplementary springs 34 is mounted between the transport wall 4 and the magnetic plate 28 with the ends of the spring being located in respective pivots. Thus, a first pivot 36 for one end of the spring 34 is provided in the transport wall 4 while a second pivot 38 for the other end of the spring 34 is provided in the magnetic plate 28. These pivots 36, 38 may be simply recesses in the wall 4 and the magnetic plate 28 with contoured ends of the spring 34 slidably fitting therein. Thus, the expansion spring 34 is effective to exert a spring pressure against the magnetic plate 28 by means of the pivot 38 and against the wall 4 by means of the pivot 36. This spring pressure is effective to supplement the spring pressure of the first spring 32. The pivots 36, 38 allow a relative movement between the spring 34 and the magnetic plate 28 and the transport wall 4.

Figure 3:
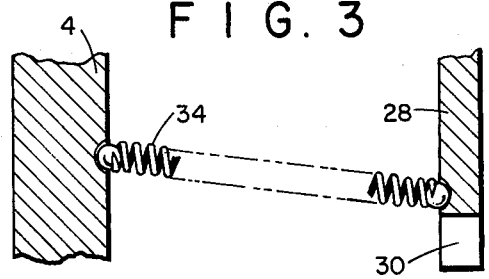
FIG. 3 is an illustration of a second operation of a portion of the present invention shown in FIG. 2
Figure 4:
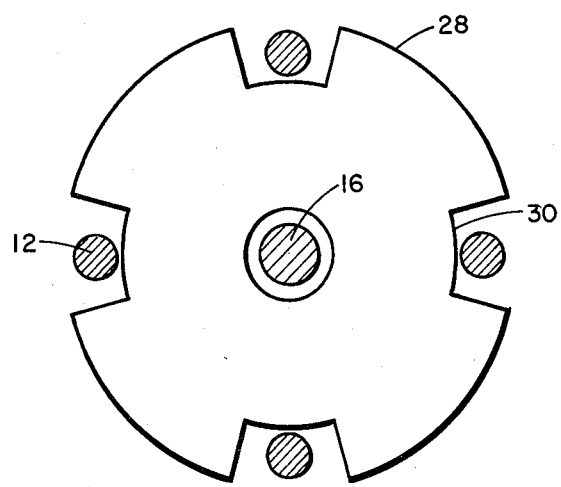
FIG. 4 is an illustration of a portion of the structure shown in FIG. 1.

As is shown in FIG. 3, such a relative movement between the spring 34 and the plate 28 and the wall 4 is effective to change the angle of the spring 34 with respect to the magnetic plate 28 and the wall 4. In a first position, as shown in FIG. 2, the spring 34 is substantially mutually perpendicular to the wall 4 and the magnetic plate 28. As shown in FIG. 3, a second position of the spring 34 is effective to produce a non-perpendicular relationship between the spring 34 and the wall 4 and the magnetic plate 28. The alteration of the spring 34 from a perpendicular to a non-perpendicular relationship is achieved by a rotation of the plate 28 with respect to the wall 4. The angular limits for the rotation of the plate 28 are determined by the cutouts 30 on the plate 28 which cutouts partially surround the spacer rods 12. Thus, in a first position of the plate 28, the spacer rods 12 abut one end of respective ones of the cutouts 30 while in a second position of the plate 28 the spacer rods 12 abut the other end of respective ones of the cutouts 30.

The rotation of the plate 28 is the result of a rotation of the shaft 8 produced by a change in direction of the movement of the tape being handled by the tape transport, i.e., from a forward to a reverse direction and vice versa. During this operation, the electromagnet 22 is de-energized and the springs 32 and 34 are effective to press the magnetic plate 28 against the brake pads 20 which are, consequently, clamped between the magnetic plate 28 and the brake plate 14 to provide a braking drag or frictional engagement. This brake drag is transmitted to the extension 16 to provide a braking effect on the motor shaft 8 which, in turn, communicates the braking effect to the tape reel and, ultimately, to the tape being transported by the tape transport. Thus, the change in direction of the tape movement is effective to rotate the plate 28 by means of the extension 16, the plate 18 and the brake pads 20 through an angular distance as determined the cutouts 30.

In the position shown in FIG. 2, the supplementary springs 34 are perpendicular to the wall 4 and the plate 28 and are effective to exert a maximum additional or supplementary first spring force on the magnetic plate 28 urging the plate 28 against the brake pads 20 to achieve a maximum braking force or drag on the motor shaft 8. In the position shown in FIG. 3, the supplementary springs 34 are at a non-90° angle, i.e., non-perpendicular, with respect to the magnetic plate 28 and the wall 4 and, accordingly, exert a diminished or less than maximum second spring force against the magnetic plate 28 to decrease their supplementary effect on the braking force applied to the motor shaft 8. In summary, when a drive command is issued to the tape transport to produce a capstan drive of the tape, power is supplied to the electromagnet 22 via the power input terminals 23. The energization of the electromagnet 22 is effective to attract the magnetic plate 28 to relieve the spring pressure on the brake pads 20 from the springs 32 and 34 and to allow a free rotation of the reel motor shaft 8. During the capstan drive of the tape, the reel motor 2 for each reel is controlled by tape position sensors to tension the tape between the reels. When the power is removed from the electromagnet 22 by a termination of the drive command of the tape transport, the electromagnet is de-energized and the springs 32 and 34 are effective to press the magnetic plate 28 against the brake pads 20 to clamp them against the brake plate 14. The net effect of the springs 32 and 34 is determined by a relative rotary position of the plate 28 to produce either a perpendicular or non-perpendicular orientation of the supplementary springs 34 with respect to the plate 28 to produce a first and a second spring force by the springs 34, respectively.

The design of the brake for the respective ones of the two reels on the tape transport would be different from each other to provide opposite braking effects. Thus, in a first direction of tape motion, a brake for a first tape reel would have its supplementary springs 34 arranged in a perpendicular relationship to provide maximum braking while the brake for the second tape reel would concurrently have its springs 34 in a non-perpendicular relationship to provide less of a braking force. When the direction of tape motion is reversed and the brakes are applied by a de-energization of the electromagnetic coil 22 in both of the brakes, the magnetic plates 28 for each tape brake are carried to the stop as determined by the cutouts 30. However, these effects are in opposite directions and the braking effect is reversed with the first brake now having a minimum braking force while the second brake would have its braking force at a maximum since its supplementary springs 34 would now be in a perpendicular relationship with the wall 4 and the magnetic plate 28. In other words, an engagement of the same side of the cutout 30 in the plate 28 for the first brake would produce an opposite orientation of the springs 34 in the first and second brakes from the concurrent contact with the same side of the cutout 30 in the plate 28 for the second brake.

Accordingly, it may be seen that there has been provided, in accordance with the present invention, an improved bidirectional tape reel brake for automatically and selectively providing a plurality of braking forces.

The embodiments of the invention in which an exclusive property or privilege is claimed are defined as follows:

1. A tape reel brake comprising:
   a tape reel motor means having a motor shaft,
   a brake pad means connected to said motor shaft,
   a brake plate means,
   a first spring means for urging said brake plate means against said brake pad means,
   a second spring means for urging said brake plate means against said brake pad means to supplement said first spring means to produce a net braking effect by said brake pad means and
   means for altering the spring pressure exerted by said second spring means from a first spring pressure to a second spring pressure to produce a first and a second net braking effect by said brake pad means, respectively.

2. A tape reel brake as set forth in claim 1 wherein said second spring means are oriented by said means for altering in a perpendicular relationship with respect to said brake plate means to provide said first spring pressure and are oriented by said means for altering in a non-perpendicular relationship with said brake plate means to provide said second spring pressure.

3. A tape reel brake as set forth in claim 1 wherein said brake pad means includes a brake pad support plate coaxial with said motor shaft, said brake plate means is coaxial with said motor shaft and said first spring means includes an expansion spring coaxial with said motor shaft.

4. A tape reel brake as set forth in claim 3 wherein said second spring means includes a plurality of expansion springs arranged in a circle coaxial with said motor shaft.

5. A tape reel brake as set forth in claim 1 wherein said brake plate means includes a magnetic material plate and further including an electromagnetic coil arranged to attract said magnetic material plate when energized to overcome said first and second spring means.

6. A tape reel brake as set forth in claim 1 wherein said means for altering includes a plurality of spacer rods and said brake plate means includes a plurality of peripheral cutouts with each cutout partially surrounding a respective one of said rods and having a peripheral length greater than the diameter of a respective one of said rods.

7. A tape reel brake as set forth in claim 6 wherein said means for altering further includes a second brake plate means attached to one end of said rods to retain said rods in a predetermined position with respect to said cutouts and being located on the other side of said brake pad means from said first-mentioned brake plate means.

8. A tape reel brake as set forth in claim 7 wherein said first and second spring means are effective to urge said first-mentioned brake plate means to clamp said brake pad means between said first-mentioned brake plate means and said second brake plate means.

9. A tape reel brake as set forth in claim 8 and further includes a support means for one end of said second spring means, said support means including a pivot for said one end of said second spring means and said first-mentioned brake plate means providing a pivot for the other end of said second spring means, said second spring means being oriented by a rotational movement of said first-mentioned brake plate means with respect to said spacer rods within the confines of said cutouts between a first position perpendicular to said first-mentioned brake plate means to produce a first spring pressure thereon and a second position non-perpendicular to said first-mentioned brake plate means to produce a second spring pressure thereon.

10. A tape reel brake as set forth in claim 9 wherein said first-mentioned brake plate means includes a magnetic material plate and further including an electromagnetic coil arranged to attract said magnetic material plate when energized to overcome said first and second spring means.

* * * * *